United States Patent Office 2,923,649
Patented Feb. 2, 1960

2,923,649

LIQUID SUSPENSION OF HIGH DENSITY PARTICLES

Hoyt H. Todd, Los Angeles, County, Calif., assignor to Superweld Corp., North Hollywood, Calif., a corporation of California No Drawing. Application February 10, 1956
Serial No. 564,640

11 Claims. (Cl. 148—24)

This invention relates to suspensions of high density particles of greater than colloidal size in a liquid medium and further relates to methods for increasing the stability of such suspensions. The present application is a continuation-in-part of my copending application Serial No. 516,781, filed June 20, 1955, now U.S. Patent No. 2,854,346, entitled Liquid Suspension of High Density Particles.

By high density particles is meant particles having a specific gravity at least on the order of magnitude of 2.25. When such particles are uniformly suspended in a liquid medium of substantially less specific gravity and is allowed to stand, the particles will inevitably settle to the bottom of the liquid and after a period of time, which may be conveniently termed the settling time, the mixture will divide into two readily differentiated parts, namely, a lower sedimentation part, and an upper part of more or less clear liquid. The stability of a liquid suspension may be measured by the duration of this settling time.

The present invention increases the stability of a suspension of high density particles of greater than colloidal size. In some instances, the settling period is so greatly prolonged that the suspension may stand for several months without observable change from its initial homogeneous appearance. In other instances, the increased settling period will be much shorter. Stability is a relative matter both in the sense that a suspension having a settling period of 10 days is stable in comparison to a suspension having a settling period of only 5 days, and in the sense that a suspension having a settling period of 5 days is stable from a practical standpoint if each batch of the suspension is always consumed in a lesser period of time.

The invention is based on the following underlying principles and discoveries:

(1) The tendency for high density particles to settle in a liquid medium of substantially lower density under static conditions may be greatly reduced by attaching gas bubbles to the particles to form particle-bubble units of approximately the same specific gravity as the liquid medium. In practice the specific gravity of each and every particle-bubble unit will not exactly match the specific gravity of the liquid medium, but the median specific gravity of the particle-bubble units may be brought approximately to the specific gravity of the liquid medium, or at least close enough for the purpose of the invention.

(2) Increasing the viscosity of the liquid medium retards the rates of rise and fall of the particle-bubble units in the liquid medium in response to specific gravity differentials.

(3) With exercise of due care to avoid an excessively wide range of particle size distribution, as well as bubble size distribution, the range of specific gravity differentials may be narrowed to such an extent that merely selecting a liquid medium of substantial viscosity reduces the rates of gravity-induced movements of the particle-bubble units to such extent as to make the separation effect of such movements insignificant if not incompletely imperceptible over relatively long periods of static storage. Various substances may be added, if necessary, to raise the viscosity of a low-viscosity liquid medium to the required degree. These first three points may be understood when it is considered that the rate of gravity-induced movement in a liquid of spherical solid particles of greater than colloidal size varies in accord with $$\frac{(D_1 - D_2)R^2}{V}$$

in which:

$D_1$=density of the spherical particles.
$D_2$=density of the liquid medium.
$R$=radius of the spherical particles.
$V$=viscosity of the liquid medium.

(4) Gas bubbles may be caused to adhere to high density particles or metallic particles in a liquid by coating the particles with a substance that is more adherent or wettable by a gas than by a liquid. Such substances, which are commonly termed collectors in the art of separating minerals by flotation, serve as water-repellent coatings and thus cause bubbles to cling to the high density particles. The amount of gas to be introduced into the liquid medium for adherence to the coated particles is rather critical but in practice is readily ascertainable by a person skilled in the art. In general, the amount of gas to be used for satisfactory results varies inversely as the size of the particles and varies directly with the density of the particles and with the concentration of the particles in the liquid medium. The introduction of too great a quantity of gas into the system will destroy the stability of the suspension. If the bubbles attached to the coated particles become too large, the bubbles coalesce to form large bubbles that rise to the surface of the suspension. This action releases the gas and makes the suspension unstable.

(5) Some collectors may be added to the liquid medium to coat particles therein; other collectors may be applied to the particles prior to immersion of the particles in the liquid. In the presently preferred practice of the invention, the coating is applied to the particles prior to immersion and the coating material must not be of such character as to cause the particles to adhere together in clusters. Collectors suitable for the purpose of the invention include, for example, oleic acid, palmitic acid, stearic acid, sodium salts of these acids, sodium ethyl xanthate, n-amyl mercaptan, amyldisulphide, dicresyl phosphates, and hydrocarbon oils.

(6) The introduction of the gas into the liquid medium may be accomplished in some instances by agitation, for example, by beating or rapidly stirring the liquid.

(7) In some instances the gas for adherence to the coated particles may be provided by introducing a liquid supersaturated with a gas. Carbonated water or water aerated under pressure may be used for this purpose.

(8) The required gas may be provided in the liquid medium by using a water soluble chemical substance that will decompose in the liquid to create a gas. Hydrogen peroxide is suitable for this purpose in an aqueous liquid medium since its decomposition product is pure water:

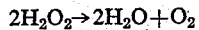
$$2H_2O_2 \rightarrow 2H_2O + O_2$$

If the high density particles are finely divided metal, the hydrogen peroxide decomposes catalytically at the surface of the particles with no assistance from other chemical agents.

(9) The required gas in the liquid medium for adherence to the particles may be provided by the interaction of an acid and a base. For example, the liquid medium may be made slightly acidic and calcium carbonate may be introduced into the acidic medium to interact therewith for the release of carbon dioxide.

(10) In some instances the required gas may be provided in the liquid medium by employing a liquid medium having an adequate quantity of gas dissolved therein, and then heating the liquid medium to drive the gas out of solution.

(11) In some instances a liquid medium may be employed with gas dissolved therein and the gas may be release to form the required bubbles simply by applying a vacuum to the liquid.

(12) Various substances may be added to increase the viscosity of liquid media for the purpose of the invention, and the selection of such substances is within the skill expected of persons working in this art. For raising the viscosity of aqueous solutions such substances as gum tragacanth, sodium carboxymethylcellulose, gum arabic, dextrin, and the like, may be added. Sodium carboxymethylcellulose is an inexpensive and effective stabilizer for solutions in which the pH is neutral or on the alkaline side, but I have found that this substance decomposes in solutions of pH below 7. Gum tragacanth, gum arabic, and dextrin are stable over a pH range of approximately 2 to 10. Where a great increase in viscosity by the addition of only a small amount of substance is required in a neutral or alkaline liquid medium, gum cellulose is recommended. Some types of sodium carboxymethylcellulose give extremely high viscosity when added to a liquid in very small relative amount.

(13) The ratio of the liquid medium to the high density particles suspended therein may be reduced for some purposes to give the suspension a consistency of a paste. As will be explained, such a paste, for example, may be formulated for use in bonding metal parts by furnace brazing. A suitable lubricant may be added to such a paste composition to facilitate the flow of the composition through small ducts and nozzles. A brazing composition incorporating a lubricant, for example, an appropriate quantity of mineral oil may be readily applied to metal joints by means of a squirt can, pressure gun, or the like. The mineral oil also increases the bond between the bubbles and the high density particles.

(14) When bubbles are caused to adhere to the high density particles to make particle-bubble units, in effect, the size of the particles is increased with consequent increase in the effective volume of the particles. This feature of increase in the effective size of the particles may be utilized to increase the stability of a suspension, and in some instances the result is a suspension that will be stable over an indefinitely extended period of time even though the effective density of the particle-bubble units is actually substantially greater than the density of the liquid medium. Such an unusually high degree of stability is achieved when the volume of the liquid medium is just sufficient to fill the voids in the mass of particle-bubble units when that mass has had ample opportunity to settle. In practice such as stable suspension is accomplished merely by causing the bubble to adhere to the high density particle to result in the desired particle-bubble units, then permitting the suspension to stand for the duration of its settling period, and finally carefully drawing off the excess liquid above the sedimentation level. It is apparent that in such a suspension the bubbles serve as means to space the high density particles apart in the liquid medium.

In one outstanding practice of the invention for the production of a copper paste to be used for furnace brazing, the following ingredients were mixed well together:

16 lbs. copper powder
80 grams soap (sodium stearate)
24 grams high viscosity sodium carboxymethylcellulose The following ingredients were then added, mixed well, and thoroughly agitated to introduce bubbles of air:

2200 to 2600 cc. water, depending upon the particular viscosity desired
60 cc. mineral oil (liquid petrolatum N.F.)
16 cc. aqueous formaldehyde solution (37%)
160 cc. glycerine
26 cc. oleic acid The result is a stable paste of the consistency of creamy malted milk that may be kept stationary for many months in a sealed container with no evidence of separation between the liquid medium and the suspended metal particles. The soap (sodium stearate) serves as a collector to coat the copper particles to make the copper particles more wettable by a gas than by a liquid. The added sodium carboxymethylcellulose raises the viscosity of the solution to a level that makes the gravity-induced movements of the particle-bubble units negligible; the mineral oil and the oleic acid lubricate the particles to facilitate flow of the paste through small passages and orifices and thereby makes it possible to dispense the paste by means of squirt cans. The mineral oil and the oleic acid also serve as collectors to increase the adherence of the bubbles to the high density particles. The addition of the oleic acid reduces the pH to about 7.5 and thereby keeps the product from curdling. The pH can be lower. Other fatty acids may be substituted, including palmitic acid and stearic acid.

The formaldehyde, being a strong reducing agent, removes dissolved oxygen, keeps the copper bright by preventing oxidation thereof, and prevents corrosion of any metal container that may be used for the product. The formaldehyde removes the oxygen from the entrained bubbles, so that the bubbles are essentially nitrogen bubbles. The formaldehyde also cooperates with the copper to prevent the growth of bacteria and fungi.

The glycerine has two functions. Being hygroscopic, it keeps the paste from drying out when applied to an object and thus keeps the applied paste from becoming brittle and flaking off. Secondly, the glycerine increases the tenacity and durability of the bubble films and thereby increases the stability of the final product, eliminating any appreciable tendency for the particles to settle.

Preferably the copper powder is fine enough for 90% to pass through a 325 mesh screen. A recommended particle size distribution is as follows:

| | |
|---|---|
| +100 mesh | 0.1 max. |
| −100 +150 mesh | 0.5 max. |
| −150 +200 mesh | 4.0 max. |
| −200 +250 mesh | 1.5 max. |
| −250 +325 mesh | 2.0 to 7.0 |
| −325 | 90.0 min. |

The gum cellulose should have a viscosity, for example, on the order of magnitude of 1000 to 2800 centipoises in a solution of 1% concentration at 25° C. A suitable grade of sodium carboxymethylcellulose for this purpose is known to the trade as Hercules CMC–70 High, produced by Hercules Powder Company of Wilmington, Delaware.

In a second practice of the invention, the above formula is modified by omitting the formaldehyde, the glycerine and the oleic acid. These ingredients are replaced by 16 cc. of 20 volume $H_2O_2$. The hydrogen peroxide serves as a gas generator to produce the required fine bubbles for adherence to the coated copper particles. If this modified formula is used for suspending high density particles other than copper and silver particles, a germicide should be added to prevent decomposition of the product by bacteria or molds. One percent of pine oil or of formaldehyde may be added for this purpose. The resulting paste may be kept stationary for as long as a month in a sealed container with no evidence of separation between the liquid medium and the suspended metal particles.

The principle of the invention may also be applied to the production of a relatively stable suspension of high density particles in nonaqueous solutions.

In a further practice of the invention, for example, 75 grams of copper powder sufficiently fine to pass through 300 mesh screen was intimately mixed with 3 grams of ethyl cellulose and 75 cubic centimeters each of toluol and acetone were added to the mixture. .05 gram of sodium secondary butyl xanthate was added and then the sample was thoroughly shaken in a glass graduate. Over the next 48 hours the sample was shaken occasionally to completely dissolve the sodium carboxymethylcellulose. After the sodium carboxymethylcellulose was completely dissolved, the sample was thoroughly shaken for thorough intermixture and for the dispersal of bubbles therein. After 48 hours the sample still had an initial appearance of complete uniformity. In contrast, a second sample processed in the same manner but with butyl xanthate omitted had a settling period of 4 hours.

A further feature of the invention is that high density particles, for example, metallic particles, may be coated with a collector, i.e. a substance that is more adherent or wettable by a gas than by a liquid, and that such a coated powder product may be sold as a dry composition for ultimate use in the production of such suspensions. Thus soap coated copper powder may be prepared and stored or sold for ultimate use in the production of the previously described copper paste for use in furnace brazing.

My description of selected practices of the invention, by way of example and to illustrate the principles involved, will suggest modifications, substitutions and other departures from my disclosure that properly lie within the spirit and scope of the appended claims.

I claim as my invention:

1. A method of combining metal particles of greater than colloidal size with a liquid to form a suspension having relatively high stability under static conditions, including the steps of: coating the metal particles with a collector to make the particles more adherent to a gas than to a liquid; dispersing the coated particles in a liquid containing a reducing agent; and agitating the mixture to cause small air bubbles to be entrained therein for adherence to the particles to form particle-bubble units with the reducing agent removing oxygen from the entrained air to result in nitrogen bubbles.

2. A method as set forth in claim 1, in which said reducing agent is formaldehyde.

3. A brazing composition of matter in the form of a static suspension, comprising: a liquid medium; solid particles of greater than colloidal size suspended in the liquid medium, said particles having a specific gravity of at least of the order of magnitude of 2.25 times the specific gravity of the liquid medium, said particles being coated with a collector to make the particles more adherent to a gas than to a liquid; and gas bubbles adhering to said coated particles and forming therewith particle-bubble units of approximately the same specific gravity as the liquid medium.

4. A composition of matter as set forth in claim 3, in which said particles are metal particles; and which includes a reducing agent.

5. A composition as set forth in claim 4, in which said gas bubbles are air bubbles with the oxygen removed therefrom by said reducing agent.

6. A composition of matter as set forth in claim 3, which includes a fatty acid to reduce the pH thereof and to increase the adherence of the bubbles to the coated particles.

7. A composition of matter as set forth in claim 3, in which said medium is an aqueous liquid; and which includes a viscosity-increasing substance in the liquid medium to reduce the rate of movement of the particle-bubble units caused by minor differences in specific gravity between the units and the liquid medium.

8. A composition for brazing together metal parts in a furnace, comprising: finely divided metal particles of greater than colloidal size in an aqueous medium, said particles being coated with a collector to make the particles gas-adherent and water-repellent; and fine gas bubbles adhering to the coating of said particles and forming therewith particle-bubble units having a specific gravity approximating the specific gravity of the aqueous medium.

9. A brazing composition as set forth in claim 8, in which said aqueous medium includes a viscosity-increasing ingredient to reduce the rate of movement of said units in the medium induced by minor differences between the specific gravity of the units and the specific gravity of the aqueous medium.

10. A brazing composition as set forth in claim 8, in which the viscosity of said medium and the concentration of said units in the medium are relatively high to give the composition a paste-like consistency.

11. A brazing composition as set forth in claim 10, which includes a lubricant to facilitate flow of the paste through small passages and nozzles for convenience in dispersing the composition.

References Cited in the file of this patent

UNITED STATES PATENTS

| | | |
|---|---|---|
| 2,007,137 | Abrams | July 2, 1935 |
| 2,017,851 | Boothman | Oct. 22, 1935 |
| 2,332,031 | Toulmin | Oct. 19, 1943 |
| 2,587,266 | Wray et al. | Feb. 26, 1952 |
| 2,594,313 | Klinker | Apr. 29, 1952 |

FOREIGN PATENTS

| | | |
|---|---|---|
| 21,490 | Australia | Mar. 23, 1936 |